United States Patent Office 3,553,990
Patented Jan. 12, 1971

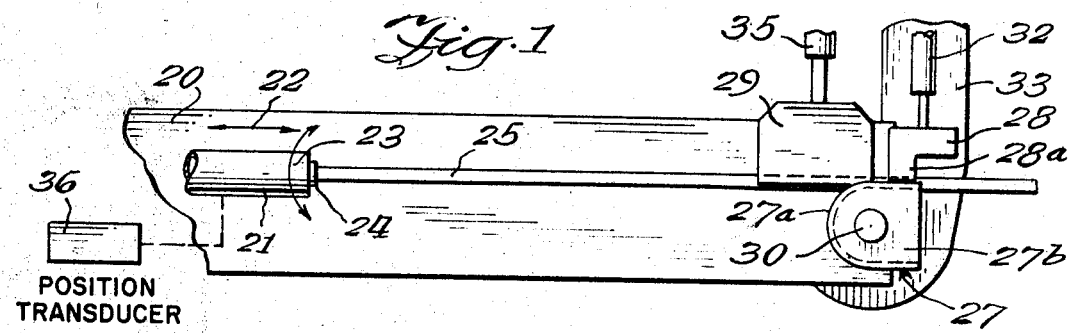
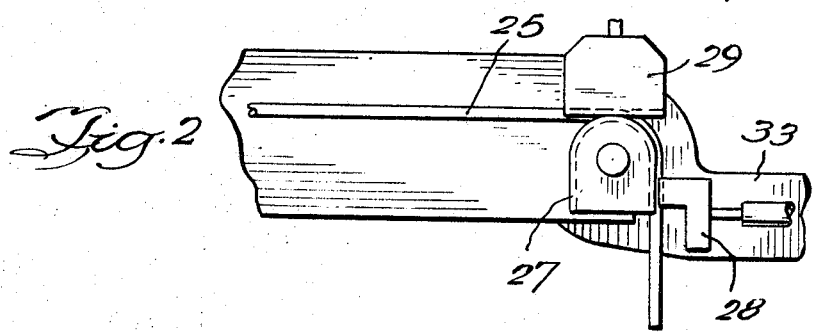
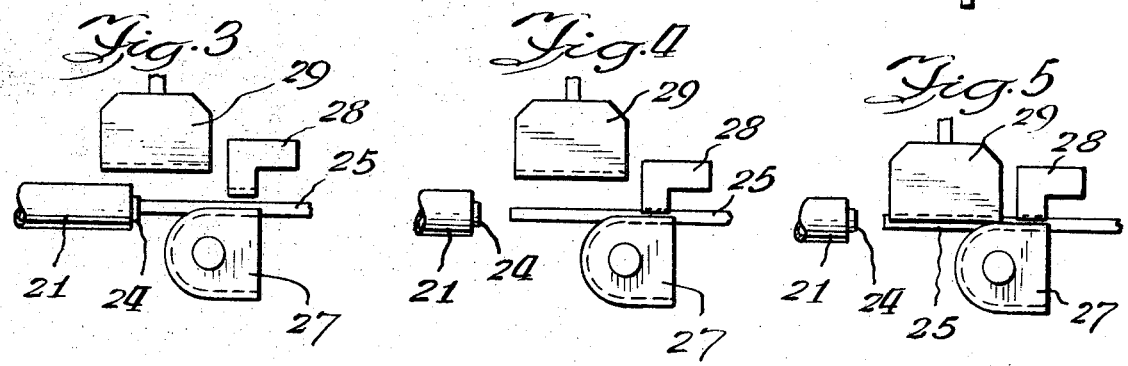
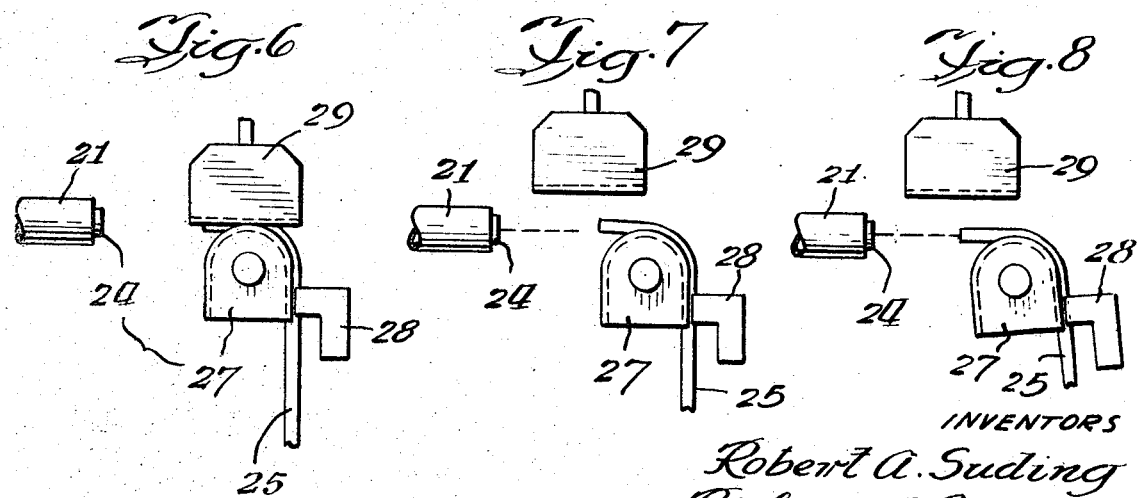

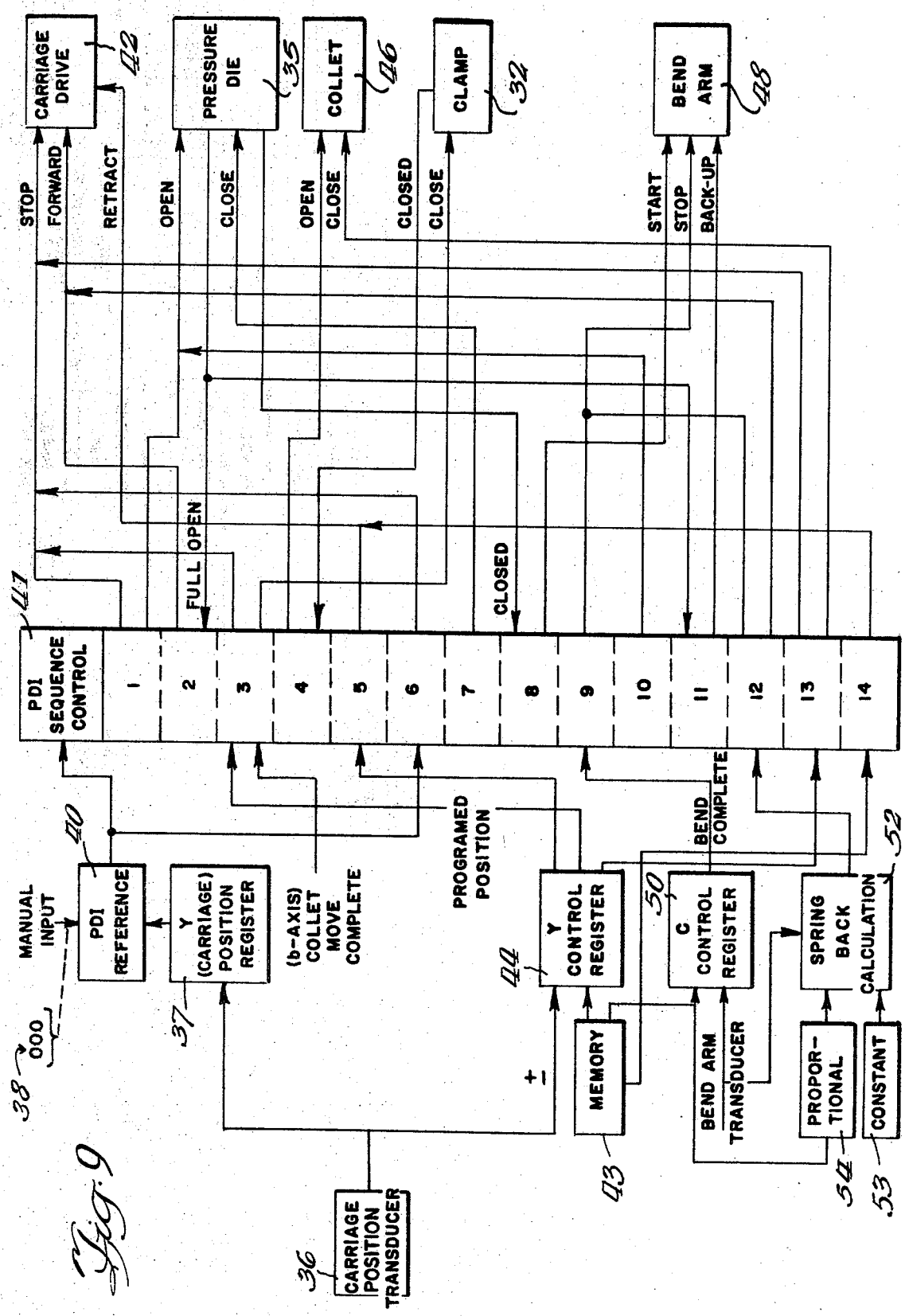

3,553,990
TUBE BENDER PRESSURE DIE INTERFERENCE CONTROL
Robert A. Suding, Boulder Hill, and Richard E. Marsh, Geneva Township, Ill., assignors to Pines Engineering Co., Inc., a corporation of California
Filed Apr. 23, 1968, Ser. No. 723,459
Int. Cl. B21b 37/12
U.S. Cl. 72—8                                        11 Claims

ABSTRACT OF THE DISCLOSURE

A numerically controlled rotary tube bender in which a control program includes information establishing bend location, plane and angle. Movement of the tube carrier into a position of interference with the pressure die causes initiation of a special control sequence. Neither the interference condition nor the special control sequence are a part of the program for bending the tube.

This invention relates to an automatic tube bending system with numerical control of the bending operation, and more particularly to a bender with a control which recognizes and compensates for movements which would cause interference between parts of the bender.

In a rotary tube bender a length of tube is held at one end, as by a releasable collet, on a moving carriage. The tube extends along a rotary die against which it is clamped during bending. A pressure die is held against the tube during rotation of the bending die, to cause formation of the bend without excessive deformation of the tube. When the bend is formed near the end of the tube which is held in the carriage, a condition of interference between the pressure die and carriage is encountered. The bend can be made by retracting the pressure die to permit the carriage to position the tube and then holding the tube, as with the clamp, while the carriage is retracted from the area occupied by the pressure die during bending. In some machines a wiper die is provided adjacent the bending die and opposed to the pressure die. It may also be retracted to permit movement of the carriage.

In prior numerically controlled tube benders it has been necessary for the programmer to anticipate the occurrence of a pressure die interference condition and to include in the program a special sequence of operations to permit making the bend. The programmer normally works from a drawing of the formed tube and must correlate the drawing information with the physical relationships of the machine to determine when an interference condition will exist. This has greatly complicated the programming of tube bending.

In accordance with the present invention, an interference situation is sensed before the carriage reaches the pressure die and a modified sequence of operation is automatically followed.

One feature of the invention is the provision of means for establishing in the control a boundary of the interference zone, together with means for determining the position of the carriage and for comparing it with the zone boundary. When interference is found, the carriage is stopped and the pressure die retracted before proceeding with the bend. More particularly, digital position information derived from a carriage position transducer is connected with a carriage position register, and the information in the register concerning carriage position is compared with digital information defining the boundary of interference zone.

Another feature is the provision of means controlling retraction of the pressure die upon completion of a bend and means controlling the advance of the carriage into the interference zone to re-engage the tube, with the pressure die retracted. To compensate for spring-back of the bent tube, the bending die is backed up to align the end of the tube with the carriage.

A further feature is that the retraction of the carriage out of the pressure die interference zone is controlled by means responsive to the means establishing the zone boundary and the means for determining the carriage position, to insure that the retracted carriage has cleared the zone.

Yet another feature is that means are provided for recording the distance the carriage is retracted and this information is used to control the movement of the carriage in returning into the interference zone after completion of the bend.

Further features and advantages of the invention will readily be apparent from the following specification and from the drawings, in which:

FIG. 1 is a fragmentary diagrammatic plan view of a rotary tube bender at the start of a bend;

FIG. 2 is a fragmentary diagrammatic plan view of the bender at the end of a 90° bend;

FIGS. 3 through 8 are diagrammatic views illustrating the sequence of operations for a bend with pressure die interference conditions; and FIG. 9 is a functional block diagram of the portions of the bender control relating to pressure die interference operation.

In the drawings and in the following description there is disclosed only so much of the bending machine and the control as is directly pertinent to the pressure die interference operation which is the subject of this invention. Suitable apparatus for the other elements of the system are known and need not be described in detail here.

The bending machine has a base 20 on which a carriage 21 is mounted for longitudinal and rotary movement as indicated by arrows 22 (y-axis) and 23 (b-motion), respectively. The carriage 21 includes a collet 24 in which a length of tube 25 to be bent is carried. The collet 24 may be clamped to the tube to cause it to move with the carriage, or may be released so that the carriage and tube may move independently.

The bending tools include a rotary bending die 27, a tube clamp 28 and a pressure die 29. Bending die 27 has a groove (not shown) in the sidewall thereof with a depth slightly less than the radius of tube 25. The die has a semicircular peripheral portion 27a at the left end and a straight sided section 27b at the right end. The bending die is rotatable about the axis of shaft 30 with which semicircular end portion 27a is concentric. Clamp 28 has an end portion 28a, also with a tube receiving groove therein, which holds the tube against the straight sided portion of the bending die. The clamp is movable toward and away from the bending die as by a hydraulic motor 32. Clamp 28 is mounted on the bend arm 33 which is fixed to and moves with shaft 30 and bending die 27. The drive means for rotating the bending assembly, which may include a hydraulic piston and cylinder operating through a linear to rotary converter and a chain drive mechanism, is not shown in FIG. 1.

Pressure die 29 has a tube receiving groove (not shown) in the face thereof and is movable toward and away from bending die 27 by hydraulic motor 35. At the start of a bend, pressure die 29 is adjacent clamp 28 and holds tube 25 against bending die 27. During the bending operation, the pressure die moves with the tube as it is wrapped around the bending die, serving the two-fold purpose of holding the tube in the groove of the bending die and preventing it from blowing outwardly as a result of the bending force applied. In FIG. 2 the parts of the machine are shown at the end of a 90° bend. Bend arm 33, bending die 27 and clamp 28 have moved through an arc of 90° and the clamp still holds tube 25 against the bending die. Pressure die 29 has moved in a straight line a distance equal to the arc of the bend and still holds the trailing edge of the tubing straight and against the peripheral portion of the bending die.

In the normal course of a bending operation, a straight tube is chucked in the collet 24 on carriage 21 and the carriage is moved longitudinally to position the appropriate point for the start of a bend at the tangent point between the semicircular and straight portions of the bending die 27. Clamp 28 and pressure die 29 are closed and a bend is formed. During the bend, collet 24 is released, the tube end is loosely received in the collet, and the portion of tube 25 used in forming the bend is drawn out. When the bend is completed, collet 24 is reclosed and clamp 28 and pressure die 29 are released, providing sufficient clearance (as a half inch or so) for tube 25 to move. Carriage 21 then moves tube 25 longitudinally to the point at which the next bend starts. At the same time, carriage 21 rotates (if necessary) so that the plane of the second bend is properly related to the plane of the first. When the tubing is positioned for the second bend, carriage 21 stops and clamp 28 and pressure die 29 close. Collet 24 opens and the second bend is formed. The process is repeated until all of the bends are made.

With the control on a machine described herein, the programmer need define merely the position, plane and bend angle for each bend.

As bends are formed in the tube, carriage 21 moves closer to the bending tools; and where a bend must be formed closer to the end of the tube than the length of pressure die 29, a condition of pressure die interference is encountered. The length of the pressure die depends primarily on the centerline radius of the tube to be bent. For small tubes, the die need not be as long as for larger tubes. A length of several inches is common and dies having a length of several feet are sometimes used.

Where an interference condition exists, the tube is bent by following the sequence of steps illustrated in FIGS. 3 through 8. In FIG. 3, pressure die 29 is fully retracted (rather than a half inch from the tube) and clamp 28 is open. Carriage 21 has moved forwardly into the interference zone, to position tube 25 at the point to be bent. In FIG. 4, clamp 28 is closed holding tube 25 against pressure die 27. Collet 24 is open and carriage 21 has been retracted. Pressure die 29 is moved into bending position in FIG. 5 and the tube is bent in the normal manner, as shown in FIG. 6. If this is the last bend to be formed, the operator removes the tube from the machine. If another bend is to be formed, pressure die 29 is retracted, FIG. 7, so that the tube can be re-engaged by the carriage. The control, section 14, looks ahead at the program in the memory to determine the last bend. During formation of the last bend, the carriage is returned to the programmed "load" position to chuck a straight tube for a subsequent bending operation. As seen in FIG. 7, when the pressure die is retracted, the trailing end of tube 25 tends to straighten out due to spring-back characteristics of the tube. If carriage 21 were to move forwardly, the tube end would not re-enter the collet, but would strike the face of the carriage. As shown in FIG. 8, bending die 27, clamp 28 and tube 25 are moved backwardly (counterclockwise) through an angle sufficient to align the end of the tube with the carriage, so that the tube may be re-engaged. After the tube end is re-engaged by the collet, clamp 28 is released and returned to the position of FIG. 3, and tube 25 advanced to the starting point of the next bend. Bending die 27 is then returned to the position of FIG. 3.

Where the tube end is loosely held in the collet during the bending operation, back-up of the bending die is not necessary as closing the collet aligns the tube with the carriage.

A wiper die (not shown), shorter than the pressure die is sometimes used. It can also be retracted in the manner described above and by the same control. It will be understood that the term "pressure die" as used in the claims, includes the wiper die.

The portion of the control circuit relevant to the pressure die interference detection and control sequence is shown in functional block form in FIG. 9.

Carriage 21 has a position transducer 36 which provides an output as the carriage moves along the machine bed 20. A carriage or y-axis position register 37 receives digital information from the position transducer and indicates the position of the carriage with respect to the bending tools. The zone of movement of the carriage in which interference may occur depends on the length of pressure die 29 and this may vary with different sets of tools fitted on the machine. The control has a manual input, as digital thumb-wheel switch 38 to set the control for the boundary of the interference zone. This boundary, for example, may be a distance measured from the tangent point of the bending die (the intersection of the semicircular portion 27a and straight section 27b in FIG. 1) beyond the far edge of the pressure die a distance equal to the deceleration distance of the carriage, when moving at its highest speed.

The information in carriage position register 37 is continuously compared with the pressure die interference reference 40 and, when the carriage reaches the interference zone the pressure die interference sequence control 41 is actuated. The control 41 has plural sections which provide for the desired series of operations of the parts of the machine. Upon actuation of the control, section 1 sends a stop signal to the carriage drive means 42 and an "open" control signal to the pressure die motor means 35. It will be appreciated that the signals described herein may be electrical, hydraulic or pneumatic or a conbination thereof, depending on the particular drive and control means used.

When pressure die 29 is fully open, a signal is sent from the die to section 2 of the sequence control which in turn restarts the carriage drive means 42, moving carriage 21 in the forward direction.

The programmed position for the bend is provided, as from a memory 43 to a y-axis control register 44, which also receives information from the carriage position transducer 36. When the carriage reaches the programmed position, the third section of the sequence control is actuated, again stopping carriage drive means 42 and actuating clamp motor 32 to close the clamp 28. When the clamp is closed, the fourth section of the control provides a collet open signal to collet actuator 46. With collet 24 open, the fifth section of the control causes carriage drive 42 to retract carriage 21. At the same time, y-axis control register 44 is gated on to store digital information from position transducer 36, indicating how far the carriage is retracted. When the carriage is outside the interference zone, as indicated by a comparison of the information in carriage position register 37 and interference reference 40, the sixth section of the control is actuated again stopping carriage drive 42.

The seventh section of the control then causes pressure die motor 35 to close the pressure die 29 and, when the die is closed, the eighth section of the control starts the bend arm drive means 48. A bend arm transducer (not shown) provides an input to the bend axis control register 50 where programmed bend angle information from memory 43 is compared with the movement of the bend arm. When the bend is completed, section 9 of the control is actuated stopping the movement of the bend arm. Section 10 of the control next opens the pressure die by operating motor 35. If no further bend is to be made, the machine stops and the operator removes the formed tube. However, if another bend is called for by the program, section 11 of the control, when the pressure die is full open, causes bend arm drive 48 to back up the bend arm, to align the end of tube 25 with carriage 21. The amount the bend arm is backed up depends on the physical characteristics of the tube and the angle through which it had been bent. A spring-back calculator 52 has a constant input 53 and a proportional input 54, set by the operator in accordance with the physical characteristics of the tube being bent. The proportion input factor is correlated with bend angle information provided from memory 43. The movement of the bend arm, from the bend arm transducer, is compared with the calculated spring-back and when sufficient back-up rotation has occurred, section 12 of the control stops the bend arm and causes the carriage drive 42 to move the carriage forward.

The distance of movement of the carriage forward is determined by the y-axis control register 44 in which the previous backward movement information has been stored. When the carriage is returned to the position at which it released the tube, the carriage drive 42 is stopped and collet drive 46 closes the collet, completing the sequence of operation.

Control information for the next bend, from memory 43, commands operation of the machine to advance the tube to the next bend position and to make the bend, following a similar sequence of steps.

While we have shown and described certain embodiments of our invention, it is to be understood that it is capable of many modifications. Changes, therefore, in the construction and arrangement may be made without departing from the spirit and scope of the invention as disclosed in the appended claims.

We claim:
1. In a numerically controlled tube bender having a rotatable bending die, a reciprocable pressure die, a reciprocable tubing clamp, a carriage with a tube holding collet for moving the tube with respect to said bending die, said carriage being capable of movement into a zone of interference with said pressure die, and a control for operating said bender in accordance with a program having information including bend position, bend plane and bend angle, the improvement comprising:
 means for establishing in said control the boundary of the zone in which the carriage interferes with the pressure die;
 means for determining the position of the carriage and for comparing it with said interference zone boundary;
 means responsive to carriage position at the zone boundary for initiating operation of a pressure die interference control, having
  means controlling the stopping of the carriage,
  means controlling retraction of the pressure die,
  means controlling advancement of the carriage to the programmed position in the interference zone after retraction of the pressure die,
  means controlling closing the clamp on a tube held in the carriage,
  means controlling release of the tube holding collet,
  means controlling retraction of the carriage out of the pressure die interference zone,
  means controlling closing the pressure die on the tube, and
  means controlling making a bend in the tube, in accordance with the programmed bend angle information.

2. The tube bender of claim 1 including means controlling the retraction of the pressure die upon completion of a bend and means controlling the advance of the carriage into the interference zone to re-engage the tube, with the pressure die retracted.

3. The tube bender of claim 2 including means controlling back-up rotation of the bending die to align the tube end with the collet.

4. The tube bender of claim 3 in which the backup of the bending die is a function of the programmed bend angle.

5. The tube bender of claim 1 including carriage position transducer means providing position information and a register connected thereto, indicating the carriage position.

6. The tube bender of claim 5 having manual digital input of interference zone boundary information.

7. The tube bender of claim 5 in which the output of said carriage position transducer is connected with an absolute carriage position register and the information in the register is compared with the interference zone boundary information.

8. The tube bender of claim 1 in which the means controlling advancement of the carriage into the interference zone is responsive to retraction of pressure die to a position outside the interference zone.

9. The tube bender of claim 1 wherein the means controlling the retraction of the carriage out of the pressure die interference zone is responsive to the means establishing the zone boundary and the means for determining carriage position.

10. The tube bender of claim 2 including means for recording the distance the carriage is retracted and in which the means for controlling advance of the carriage into the interference zone to re-engage the tube is responsive to said recording means, returning the carriage to the position at which the tube was released.

11. The tube bender of claim 1 including means controlling movement of the carriage to a "load" position during formation of the last bend to chuck a straight tube for a subsequent bending operation.

References Cited
UNITED STATES PATENTS
3,145,756  8/1964  Hill _____ 72—7

CHARLES W. LANHAM, Primary Examiner

M. J. KEENAN, Assistant Examiner

U.S. Cl. X.R.

72—14, 22, 27, 298, 319